though the relative viscosity range of 1.4 to 2.6 is the same, it can readily be appreciated that an appropriate choice of polymers may yield a composition which is capable of being converted into a cellular product having desired properties over a substantially wider range of heating conditions than has heretofore been practicable.

3,660,320
DRY BLEND POLYVINYL CHLORIDE FOAM-FORMING COMPOSITION AND METHOD

Murdoch L. Johnson, Fort Lee, and Francis J. W. Bartlett, Wallington, N.J., assignors to The Flintkote Company, White Plains, N.Y.
No Drawing. Filed June 3, 1969, Ser. No. 830,149
Int. Cl. C08f 47/10, 45/40, 29/18
U.S. Cl. 260—2.5 P                                                                        7 Claims

ABSTRACT OF THE DISCLOSURE

A particulate, dry blend, vinyl chloride polymer-containing, foam-forming composition having improved foam-forming properties is disclosed. A mixture of vinyl chloride polymers having different molecular weights, e.g., relative viscosities of 1.4 to 2.6 and a relative viscosity difference of 0.003 to 0.7 is used, to provide a composition that is foamable over a relatively wide range of heating conditions to provide a greater degree of latitude in achieving desired combinations of cell structure and physical properties of the cellular material.

---

This invention relates to cellular polyvinylchloride plastics and more particularly to an improved particulate vinylchloride-containing composition adapted to be heated to form a cellular plastic, as well as to a method of making such a particulate composition.

Cellular plastics formed of vinyl chloride homopolymers and copolymers have commonly been made by incorporating the vinyl resin in a fluid plastisol composition comprising a liquid plasticizer and a chemical foaming or "blowing" agent. The fluid plastisol composition is formed into a desired physical configuration and upon application of heat is first converted into a gel, and at a somewhat higher temperature, into a cellular plastic.

While such plastisols have been extensively used to form cellular plastics, they are subject to the disadvantages that relatively expensive emulsion-polymerized vinyl polymers must be used in preparing them, and it is difficult to control the course of the foaming reaction to achieve products having predetermined desired properties. In an effort to develop a process using less expensive starting materials, it has been proposed that the relatively inexpensive suspension-polymerized vinyl polymers be used to form a particulate dry blend that is convertible upon heating into a cellular plastic. The vinyl polymers used are of a generally porous nature and have a relatively large surface area such that they are capable of absorbing substantial amounts of liquid plasticizer and/or liquid stabilizer.

Dry blend compositions suitable for conversion into cellular plastics may be prepared by mixing such a porous suspension-polymerized vinyl polymer with a liquid plasticizer, a chemical blowing agent and various auxiliary ingredients such as fillers, pigments, heat and light stabilizers, etc. and heating to a moderate temperature say 180° to 200° F. to yield a particulate product in which the liquid components and auxiliary ingredients are absorbed in or adsorbed on the resin particles. Dry blend compositions of this type are disclosed, for example, in U.S. Pat. 3,394,210.

While cellular plastics made from such compositions are less expensive than those made from plastisols, it has been found difficult to control the conversion of such dry blends to cellular products having predetermined desired properties. In order to achieve a satisfactory fine-celled cellular product, it is desirable that the blowing agent release gas over a definite temperature range and that the gas be emitted at a controllable and fairly even rate. Because the decomposition of the blowing agent occurs within a specific temperature range, the use of any particular resin to produce a dry blend foam tends to cause either "underblown" or "overblown" products. If a low molecular weight resin is used, the foamed product tends to be too hard with tightly packed cells. If a high molecular weight resin is used, it requires a relatively high fluxing temperature, i.e., a temperature that may be above the decomposition of the blowing agent. This difficulty may be counteracted to some extent by the use of greater amounts of plasticizer, but such increase in plasticizer content adversely affects the physical properties of the cellular product.

If an effort is made to select a resin of intermediate molecular weight to overcome the foregoing difficulties, it is found that very precise control of heating temperature and time are required to achieve a given cell structure and the frequently desired combination of a fine-celled structure with good physical properties such as tensile strength, resilience and elastic recovery cannot be achieved.

It is accordingly an object of the present invention to produce a particulate free-flowing, vinyl chloride polymer composition that is foamable upon heating and has improved processing characteristics. It is another object of the invention to produce a dry blend composition of this type that is convertible by heating to acceptable cellular plastic over a wider range of heating conditions than has heretofore been possible. It is still another object of the invention to provide a dry blend composition of this type capable of conversion to cellular plastics having improved resilience and elastic recovery. It is a still further object of the invention to provide a dry blend composition of this type that provides a greater degree of latitude in achieving different desired combinations of cell structure and physical properties. It is a still further object of the invention to provide a method for making such a dry blend composition. Other objects of the invention will be in part obvious and in part pointed out hereafter.

The objects and advantages of the invention are achieved in general by forming a dry blend composition based on a mixture of two or more vinyl chloride polymers having preselected different molecular weights as described below. Since the molecular weights of high molecular vinyl chloride polymers cannot be directly measured, it is customary to specify the molecular weight of such polymers in terms of such properties as specific viscosity or relative viscosity. In the present specification and claims the molecular weights of the vinyl chloride polymers referred to, unless otherwise indicated, are given in terms of relative viscosity as determined at a 1% by weight concentration of the polymer in cyclohexanone at 25° C.

It has been found that in order to achieve the advantages outlined above, both the absolute and the relative molecular weights of the combination of vinyl polymers used should be controlled. More particularly, it has been found that the two or more polymers used in combination should have relative viscosities within the range of about 1.4 to 2.6. Also the differences in their relative viscosities should be such that the difference for the polymer combination should be within the range 0.003 to 0.7 and preferably within the range 0.02 to 0.56.

The vinyl chloride polymers useful in preparing the compositions of the present invention are, in general, known per se and are commercially available. As indicated above, they are characterized by the fact that they are suspension-polymerized vinyl chloride polymers having a high absorptive capacity for liquid plasticizers and/or liquid stabilizers. They are sometimes called "blotter" resins. Representative polymers of this type are sold under the trade designations PVC 33 (Diamond Shamrock), Trulon 510 (Thompson-Apex Co.), Exon 9282 (Firestone Co.) and Rucon D-20 (Hooker Chemical Corp.).

The polymers used need not be vinyl chloride homopolymers, but may also be copolymers of vinyl chloride made with up to 15% by weight of comonomers polymerizable therewith. Suitable comonomers include vinylidene chloride, vinyl acetate, dibutyl maleate, diethyl fumarate, methyl methacrylate and the like. When the term "vinyl chloride polymer" is used herein, it is intended to include both the homopolymer and copolymers containing up to 15% by weight of units derived from such copolymerizable comonomers.

In general, preferred results have been obtained by using, in combination, approximately equal quantities by weight of polymers having different molecular weights within the range indicated above. However, in the case of binary mixtures of polymers, the proportions may vary from a weight ratio of about 1:9 to a weight ratio of about 9:1. When more than two polymers of different molecular weight are used, each polymer should desirably be present to the extent of at least about 10% by weight in the mixture.

In preparing the present dry blend compositions, the combination of vinyl chloride polymers is mixed with conventional stabilizers, plasticizers and auxiliary special purpose ingredients. Plasticizers useful in preparing the present compositions include butyl benzylphthalate, dioctylphthalate, dioctyladipate, dibutylphthalate, didecyl adipate, di-n-hexyladipate, diethylhexyl azeolate and di-hexylphthalate. Useful heat stabilizers include barium-cadmium myristate or laurate or combinations thereof. Zinc octoate and lead stearate can be used as light stabilizers. More generally, any of the plasticizers and stabilizers previously known to be useful in the preparation of dry blend foamable vinyl chloride polymer compositions can be employed. The quantity of plasticizer usually falls within the range 40 to 90 parts by weight per 100 parts by weight of polymer, although greater or lesser amounts of plasticizer can be used in particular cases.

The blowing agents used in preparing the present compositions may also be those conventionally employed in making cellular vinyl chloride polymer plastics. Such blowing agents are organic compounds which, when heated, decompose to yield an inert gas and whose residues, if any, are compatible with the vinyl chloride polymers employed in the foamable composition. Typical blowing agents useful in preparing the present compositions are azodiformamide, azodicarbonamide, azoisobutyronitrile, N,N'-dimethyl-N,N'-nitrosoterephthalamide and dinitrosopentamethylene tetramine.

The blowing agents may be dispersed in all or part of the liquid plasticizer or may be added to the mix in dry powder form. It is usually desirable to employ some 1 to 10 parts of the blowing agent per 100 parts of resin. As is known in the art, the larger amount of blowing agent employed within practical limits, the greater is the expansion of the foamed plastic. Since the blowing agents tend to be rather costly, the amount of blowing agent used is desirably maintained at as low a level as possible consistent with obtaining the desired density in the finished foam.

The auxiliary ingredients used may be, for example, finely divided silicas such as those sold under the trade names "Santocel Z" and "Carbo Sil" or other finely divided materials of about 4 to 12 microns particle size to improve the free flowing characteristics of the dry blend composition. However, it has been found that such "drying agents" are not essential since by careful control of mixing conditions in the mixer and by avoiding too rapid a buildup of the temperature during the high temperature period of the mixing cycle, as well as by proper selection of the vinyl esters used, it is possible to obtain a free flowing product without using a drying agent. The term "free flowing" as used in the present specification indicates that the product has a flow rate of at least 5 cc. per second when tested in the equipment described in ASTM-D-392-38.

With formulations employing relative low molecular weight resins, it is sometimes desirable to employ as a drying aid from ½ to 2% of a vinyl dispersion polymer such as that sold under the trade name "Firestone 654." However, in general, the drying agent should be omitted if possible because of the relatively poor heat stability of the dispersion resin.

Fillers, pigments and the like may be added to the composition as desired. Also, in some cases, wetting agents, e.g., that sold under the trade name Arosurf Hel-418 (ADM Chemicals) may be used. Epoxidized soya bean oil containing say 6 to 9% oxirane oxygen may be used as an auxiliary stabilizer.

The procedure for making the present compositions may be generally described as follows: The preselected combination of vinyl chloride polymers in particulate form is charged to a suitable vortex mixer, such as a Papenmeier or Henschel mixer, together with the stabilizer and, if desired, a filler such as calcium carbonate. The materials are mixed at the slowest speed available, which is usually between 1500 and 2000 r.p.m.

A plasticizer blend is prepared in which the blowing agent is dispersed, together with any pigments that may be required, and this dispersion is added to the mixer. The mixing speed is then gradually increased to increase the temperature of the mixture to about 180° to 200° F., at which point cooling of the mixture is initiated. Mixing is continued until the temperature of the mixture has dropped to about 120° F.

The composition is then discharged from the mixer and stored for about 24 hours at about room temperature (70° F.), during which time it tends to lose any minor dampness and becomes a free flowing composition of sand-like consistency. The particle size is usually such that most of the particles pass through a 20-mesh screen.

Cellular plastics can be prepared from such a particulate dry blend composition in a variety of ways depending upon the ultimate use to which the cellular material is to be put. For example, if the material is desired in strip or sheet form, the powder may be deposited in a thin layer on a moving web of a material from which cellular material can subsequently be readily stripped such as a metal belt or fabric belt pre-treated with a release agent. The powder may be applied to the moving web, for example, by a knife over roll or by simply drawing the dry blend powder beneath a rod suspended at a predetermined height above the web on which the dry blend powder is conveniently heaped. The resulting layer of dry blend composition is initially heated at a relatively low temperature to sinter the powder and thereafter heated to a controlled higher temperature for a predetermined period of time to cause the blowing agent to decompose and the desired cellular structure to form. Heating can be effected in a tunnel or oven by a stream of hot air, or by radiant heaters, or both. In general, the foaming step is carried out by heating the sintered dry blend at temperatures within the range 350° to 400° F. for 0.5 to 5 minutes.

Cellular plastics prepared from the present compositions may be used as sheet goods to replace the previously used products formed from plastisol. Also they may be used as, or as a part of, floor coverings. Thus they may be laminated to tufted carpets as a tuft-locking layer. They may also be laminated to other types of substrates such as textiles, wood and/or paper felt for use in automobiles and aircraft as cushioning and insulation in doors, roofs, and other parts of the vehicle. A thin layer of the cellular material, say 0.02 inch to 0.045 inch in thickness, may be coated with a thin plastisol skin-coat or other non-dry-blend skin coat to provide a non-porous surface finish and used for upholstery, clothing and other media where plastisol foam is currently used. Other uses of the cellular product include products made by flocking textile particles or powders onto the fused or partially fused dry blend composition before or after complete expansion of the dry blend foam, packaging or wrapping materials in applications where urethane and other non-vinyl foams are now used.

In order to further point out the nature and advantages of the present invention, the following specific examples are given of illustrative embodiments of the process, product and use of the present invention.

EXAMPLE 1

A foamable composition was prepared from the following formulation using vinyl chloride polymers having a relative viscosity difference of 0.34. The ingredients are given in parts by weight.

| | |
|---|---|
| Suspension-polymerized vinyl resin, rel. vis. 2.02 | 75.0 |
| Suspension-polymerized vinyl resin, rel. vis. 1.68 | 25.0 |
| Di-octyl phthalate | 50.0 |
| Di-isodecylphthalate | 35.0 |
| Epoxy tallate stabilizer | 3.0 |
| Lead dibutyl phthalate stabilizer-activator | 1.5 |
| Lead maleate stabilizer-activator | 1.5 |
| Calcium carbonate (Camel White) | 30.0 |
| Azo dicarbonamide | 5.0 |

The resins, activator-stabilizers and half of the calcium carbonate were added to a Papenmeier high speed mixer at room temperature. The ingredients were mixed until a temperature of 145° to 160° F. had been reached. Before introduction of the plasticizers di-octyl- and di-isodecylphthalate, they are preblended and heated to 120° to 140° F.

The plasticizers were added to the mix and heating continued until a temperature of 180° to 220° F. had been reached. At this point the second half of the calcium carbonate was added to the mix. The resulting mix comprised free flowing particles and was discharged into a water-cooled blender where the temperature was reduced to about 80° F. The cooled composition was screened free of undesirable oversized particles.

Foam fabrication

In order to form a foamed vinyl sheet in accordance with the invention, a layer of the free flowing dry blend powder was applied to a carrier which was a moving silicone-treated Teflon sheet. The thickness of the powder layer on the carrier was controlled by a doctor knife suspended at a predetermined height above the carrier to provide a powder layer 0.08 inch thick. The carrier with the powder layer thereon was then moved through an oven having a preheating section and a main heating section both heated by radiant heaters confronting the powder layer. The residence time of the powder layer in the preheating section was 30 seconds and in the main heating section one minute. In the preheating section of the oven the powder particles were heated to a temperature within the range 200° to 340° F. to cause them to sinter together. In the main heating section the powder layer was heated to 360° to 385° F. to cause the blowing agent to decompose and form a cellular plastic.

After emergence from the oven the foamed plastic layer was stripped from the carrier. It was found to have a thickness of 0.145 inch and its density was 16 pounds per cubic foot.

EXAMPLE 2

A dry blend composition was prepared as described in Example 1 from the following formulations:

| | |
|---|---|
| Suspension polymerized vinyl resin, rel. vis. 2.24 | 50.0 |
| Suspension polymerized vinyl resin, rel. vis. 1.98 | 50.0 |
| Dioctyl phthalate | 35.0 |
| Di-isononyl phthalate | 25.0 |
| Epoxy tallate stabilizer | 3.0 |
| Cadmium stearate | 1.5 |
| Tri-phenyl phosphate | .5 |
| Calcium carbonate (Camel White) | 35.0 |
| Azo dicarbonamide | 5.0 |

The dry blend powder was applied to a carrier which in this case was a sheet of kraft paper previously treated with a release agent. The thickness of the powder layer was .090". The dry blend resin particles were subjected to a 30-second radiant heating cycle in order to sinter the particles. The kraft paper carrier with the sintered resin particles thereon was then passed through a hot air heated oven at 8 ft. per minute with a hot air velocity of 5000 ft. per second on the top and bottom of the travelling web. The temperature of the oven was set at 390° F. The thickness of the blown foam was 0.135". The density of the foam after it had been stripped from the kraft paper was 20 pounds per cubic foot.

EXAMPLES 3 THROUGH 14

In this series of examples the following formulation was used in parts by weight, using the procedures of Example 1, with the only variation being in the nature of the vinyl resin component.

| | |
|---|---|
| Vinyl resin mixture | 45 |
| Calcium carbonate | 12 |
| Barium-cadmium-zinc myristate | 0.873 |
| Triphenyl phosphite | 0.5 |
| Arosurf Hel–418 wetting agent | 0.328 |
| Epoxidized soya bean oil (Admex 710) | 1.0 |
| Azodicarbonamide (Kempore 60) | 1.5 |
| Dibutyl phthalate | 23 |
| Dioctyl phthalate | 10.6 |

Combinations of resins of different relative viscosity were used as indicated in Table I below. In each case where more than one resin was used, equal parts by weight of the several resin were employed to make the total resin content 45 parts. The viscosities of the resins are given in the second column of Table I, the differences in relative viscosity of the resin components are given in the third column of the table, and the foam-forming temperature and oven time in minutes in the fourth and fifth columns.

The sixth column indicates the nature of the cell structure obtained, "F" for fine, "M" for medium and "C" for coarse. The seventh and eighth columns of the weight of the several resins were employed to make the sion set values of the cellular plastic as determined in accordance with ASTM–D–1056–62–T.

TABLE I

| Example No. | Relative viscosities of resins | Viscosity difference | Oven temperature | Oven time (min.) | Cell structure | Compression deflection | Compression set (percent) |
|---|---|---|---|---|---|---|---|
| 3 | 2.16+2.19+2.22 | 0.06 | 380 | 2 | F | 24 | 12 |
| 4 | 2.13+2.16+2.19 | 0.06 | 380 | 2 | F | 23 | 12½ |
| 5 | 2.13+2.19 | 0.06 | 375 | 2 | F | 22 | 12½ |
| 6 | 2.07+2.13 | 0.06 | 375 | 2 | F | 21 | 12 |
| 7 | 2.04+2.07 | 0.03 | 375 | 2 | F–M | 22 | 13 |
| 8 | 2.01+2.04 | 0.03 | 375 | 2 | F–M | 21 | 14½ |
| 9 | 1.78+2.01 | 0.23 | 380 | 2 | F–M | 22 | 15½ |
| 10 | 1.78+2.19 | 0.41 | 385 | 2 | M–C | 21 | 18 |
| 11 | 1.78+2.34 | 0.56 | 385 | 2½ | M–C | 20 | 19 |
| 12 | 1.78+2.40 | 0.62 | 390 | 2½ | M–C | 18 | 20 |
| 13 | 1.50+2.40 | 0.90 | 380 | 2¾ | M–C | 12 | 21 |
| 14 | 2.01 | | 370 | 2 | M | 11.5 | 20 |

The data of the foregoing table show that for a given set of conditions significant increases in compression deflection and decreases in compression set are obtained by using mixture of resins of different relative viscosities in accordance with the present invention.

EXAMPLES 15 TO 22

In order to bring out the fact that when using combinations of resins of different molecular weights in accordance with the present invention less precise control of the foaming process is required, comparative tests were made wherein a series of dry blend compositions, prepared as in Example 1, were foamed by placing them in a 420° F. oven for varying periods of time. In these examples, 5 gram samples using the formulation of Examples 3 to 14 were used, except that the vinyl resin was varied as indicated in Table II below. The samples were placed in aluminum cups which were vibrated to achieve a level upper surface before introduction into the furnace. The data of Table II indicate by code letters the type of cell structure that was obtained with oven residence times varying from 1 minute to 3½ minutes. The letter code used is as follows:

UB—underblown
OB—overblown
GB—good blow
SR—slight rise
FB—fair blow

In cases where more than one resin was used, equal parts by weight of the several resins were employed.

TABLE II

| Example No. | Relative viscosities of resins | 1 | 1½ | 2 | 2½ | 3½ |
|---|---|---|---|---|---|---|
| 15 | 2.46+2.49+2.52 | UB | SR | GB | GB | GB |
| 16 | 1.65+1.68+1.70 | FB | GB | GB | GB | ¹OB |
| 17 | 1.65+2.49 | SR | FB | FB | FB | ¹OB |
| 18 | 1.65 | OB | OB | OB | OB | OB |
| 19 | 1.68 | OB | OB | OB | OB | OB |
| 20 | 2.49 | UB | UB | UB | UB | OB |
| 21 | 2.52 | UB | UB | UB | UB | OB |
| 22 | 2.58 | UB | UB | UB | UB | OB |

¹ Slightly.

The data of Table II show that by using a mixture of resins in accordance with the present invention, acceptable cell structure can be obtained over a relatively wide range of oven residence times. Thus the heating conditions are less critical with this process and uniformity of product on a practical day-to-day basis can be more readily achieved.

As indicated above, it has been found desirable in most cases to use a resin mixture containing approximately equal amounts by weight of the resin components, although variations in the range 2:1 to 1:2 appear to produce little variation in properties. As the disproportion in amounts of resins is increased to say 5:1 or 1:5 some decrease in compression deflection has been noted. In nearly all cases the proportions should desirably be within the range 9:1 to 1:9.

In Tables I and II above the data presented are for a single formulation in order to bring out the effect of varying the nature of resin or resin mixture on the processing and foaming properties of the dry blend foam compositions of the invention. It has been found that variations in the nature and amount of the other ingredients of the formulation have little effect on these properties. More particularly, it has been found that variations in the nature and amount of the plasticizers, stabilizers, blowing agents and auxiliary ingredients employed have approximately the same effect on the properties of the cellular product, whether a mixture of resins is used according to the present invention or whether a single resin is used according to the prior art disclosures.

From the foregoing description it should be apparent that the present invention provides a particulate polyvinyl chloride dry blend foamable composition that is considerably less temperature-sensitive than the compositions of the prior art. By using a mixture of resins as disclosed herein, acceptable cell structure can be achieved with varying heating schedules, and thus a greater variety of combinations of desired cell structure and physical properties can be achieved. It is of course to be understood that the foregoing examples are intended to be illustrative only and that numerous changes can be made in the ingredients, proportions and operating conditions illustratively disclosed without departing from the spirit of the invention as defined in the appended claims.

We claim:

1. In a method of making a dry, particulate composition adapted upon heating to form a cellular plastic in which a blend of a suspension-polymerized vinyl chloride polymer, a liquid plasticizer and a blowing agent are heated to cause the plasticizer and blowing agent to be absorbed in or adsorbed on the polymer particles, and the resulting product is cooled, the improvement which comprises using a mixture of two or more suspension-polymerized vinyl chloride polymers or copolymers having relative viscosities as measured at a 1% by weight concentration in cyclohexanone at 25° C. in the range 1.4 to 2.6, the difference between the relative viscosities of the polymers being in the range 0.003 to 0.7, said mixture containing at least 10% by weight of each polymer component thereof based on the total weight of vinyl chloride polymer present.

2. A method according to claim 1 in which the difference in the relative viscosities of the vinyl chloride polymers is 0.02 to 0.56.

3. A method of making a dry, free-flowing, particulate composition adapted upon heating to form a cellular plastic which comprises preparing a mixture of two or more particulate suspension-polymerized vinyl chloride polymers having different relative viscosities, a liquid plasticizer and a blowing agent, said mixture containing at least 10% by weight of each polymer component based on the total weight of vinyl chloride polymer present and also containing per 100 parts by weight of polymer from 40 to 90 parts of plasticizer and from 1 to 10 parts of blowing agent, the relative viscosities of the polymers as measured at a 1% by weight concentration in cyclohexanone at 25° C. being in the range 1.4 to 2.6 and the difference between the relative viscosities of the polymers being in the range 0.003 to 0.7, heating the resulting mixture to cause the plasticizer and blowing agent to be absorbed in or adsorbed on the polymer particles, and cooling the resulting product.

4. A method according to claim 3 in which the difference in the relative viscosities of the vinyl chloride polymers is 0.02 to 0.56.

5. A dry, free-flowing particulate composition adapted to be heated to form a cellular plastic, said composition comprising particles of a mixture of two or more suspension-polymerized vinyl chloride polymers containing at least 10% by weight of each polymer component and having per 100 parts by weight of polymer from 40 to 90 parts of plasticizer and from 1 to 10 parts of blowing agent absorbed in or adsorbed on the polymer particles, the component vinyl chloride polymers having relative viscosities in the range 1.4 to 2.6 as measured at a 1% by weight concentration in cyclohexanone at 25° C. and the difference in relative viscosities of the component vinyl chloride polymers being in the range 0.003 to 0.7.

6. A composition according to claim 5 wherein the difference in the relative viscosities of the component vinyl chloride polymers is from 0.02 to 0.56.

7. A fine-celled cellular plastic made by heating the composition of claim 6 to a temperature within the range 360° to 390° F.

References Cited

UNITED STATES PATENTS

| | | | |
|---|---|---|---|
| 3,090,763 | 5/1963 | Hillier | 260—2.5 P |
| 3,293,108 | 12/1966 | Nairn et al. | 260—2.5 P |
| 3,394,210 | 7/1968 | Franze | 161—160 |

FOREIGN PATENTS

| | | | |
|---|---|---|---|
| 752,915 | 2/1967 | Canada | 260—2.5 P |

MURRAY TILLMAN, Primary Examiner

W. J. BRIGGS, SR., Assistant Examiner

U.S. Cl. X.R.

161—67, 159; 260—2.5 B, 31.8 M, 31.8 W, 45.75 R, 45.8 A, 45.85, 78.5 CL, 86.3, 87.1, 87.5 R, 92.8 W, 92.8 A, 899, 901